United States Patent Office 3,546,137
Patented Dec. 8, 1970

3,546,137
HYDROCARBON CONVERSION CATALYST AND PROCESS FOR MAKING SAME
Elroy M. Gladrow and Warren M. Smith, Baton Rouge, La., assignors to Esso Research and Engineering Company, a corporation of Delaware
No Drawing. Continuation-in-part of application Ser. No. 570,441, Aug. 5, 1966. This application Apr. 18, 1969, Ser. No. 817,579
Int. Cl. B01j 11/40; C01b 33/28
U.S. Cl. 252—455      8 Claims

ABSTRACT OF THE DISCLOSURE

An improved process for preparing hydrocarbon conversion catalyst comprising synthetic crystalline aluminosilicate zeolites distributed throughout a siliceous matrix. The hydrocarbon conversion catalyst is prepared with a minimum of process steps such as filtration and exhibits catalytic properties which are easily reproduced. The improved results are associated with an added step to a conventional process comprising contacting a previously exchanged zeolite with a volatile ammonium compound.

RELATED APPLICATIONS

This application is a continuation-in-part of copending application Ser. No. 570,441, filed Aug. 5, 1966, now abandoned.

SUMMARY OF THE INVENTION

This invention relates to an improved process for preparing hydrocarbon conversion catalysts comprising synthetic crystalline alumino-silicate zeolites which are distributed throughout a siliceous matrix, the catalysts produced thereby and their use in hydrocarbon conversion processes.

Crystalline alumino-silicate zeolites, commonly referred to as "molecular sieves," are well known in the art. They are characterized by their highly-ordered crystalline structure and uniformly-dimensioned pores, and are distinguishable from each other on the basis of composition, crystal structure, adsorption properties and the like. The term "molecular sieves" is derived from the ability of these zeolite materials to selectively adsorb molecules on the basis of their size and form. The various types of molecular sieves may be classified according to the size of the molecule which will be rejected (i.e. not adsorbed) by a particular sieve. A number of these zeolite materials are described, for example, in U.S. Pat. 3,013,982, wherein they are characterized by their composition and X-ray diffraction characteristics. In addition to their extensive use as adsorbents for hydrocarbon separation processes and the like, it has recently been found that crystalline alumino-silicate zeolites, particularly after cation exchange to reduce alkali metal oxide content, are valuable catalytic materials for various processes, particularly hydrocarbon conversion processes, e.g. catalytic cracking.

In connection with the use of crystalline zeolites as hydrocarbon conversion catalysts, it has been found that the extremely fine size crystals which are usually produced in their manufacture have generally proved unsuitable in moving or fluidized bed operations because of excessive carry-over losses. Further, these crystalline zeolites are frequently unsuitable for direct use as catalysts because of extremely high activity which may often lead to overconversion and undesirable product selectivity. Accordingly, it has recently been discovered that an improved form of crystalline alumino-silicate zeolite containing catalyst, which is suitable for moving or fluidized bed operations, and particularly for hydrocarbon conversion processes, can be produced by distributing the crystalline zeolite throughout a siliceous gel or cogel matrix. The terms "gel" and "cogel" as used herein are intended to include gelatinous precipitates, hydrosols, or hydrogels of silica and/or admixtures of silica and one or more oxides of metals selected from Groups II–A, III–A and IV–B of the Periodic Table, e.g. alumina, magnesia, zirconia, titania, etc. The silica content of the gel may range from about 55 to 100 wt. percent. The term "siliceous" as used herein is thus intended to include silica per se as well as silica in combination with one or more of the above metal oxides. Silica-alumina cogel is especially preferred. The resulting composite, which consists of crystalline zeolite distributed throughout a siliceous gel or cogel matrix, has been found to exhibit improved catalytic selectivity, stability and fluidization properties.

A relatively simple means of incorporating the crystalline alumino-silicate zeolite into the siliceous matrix is to add preformed zeolite crystals to a suitable hydrogel, such as a silica-alumina hydrogel, and homogenize the resulting mixture by passage through a blending apparatus, such as a colloid mill, ball mill, and the like. The homogenized slurry is then formed into particles of a size range desired for fluidized bed operations. This may be conveniently accomplished by any rapid drying technique, such as spray drying, although other methods may be employed.

The present invention is particularly directed to the use of the ammonium form of zeolite embedded in the aforementioned matrix materials. By means of the present invention, an improved zeolite-matrix catalyst of consistently high quality is produced. Before describing the invention in detail, it should be first understood that when these crystalline alumino-silicate zeolites are to be used as catalytic agents for hydrocarbon conversion processes, they must be subjected to cation exchange to reduce their alkali metal oxide (e.g. $Na_2O$) content to less than about 10 wt. percent, preferably less than about 6 wt. percent, since alkali metal oxides do not promote the desired hydrocarbon conversion reactions. The alkali metal oxide content is customarily reduced by ion exchange treatment with solutions of ammonium salts, or salts of metals in Groups I to VIII and the rare earth metals, preferably metals in Groups II, III, IV, V, VI–B, VII–B, VIII and rare earth metals. The ion exchange can be simply accomplished by slurrying the zeolite product with an aqueous solution of the desired cation at temperatures of about 60 to 180° F. to replace the alkali metal, and washing the resulting base-exchanged material free of soluble ions prior to drying.

The zeolite utilized in the present invention will have been base exchanged with ammonium cation in order to produce the "ammonium" or "hydrogen" form. In connection with the preparation of this ammonium-form zeolite-matrix catalyst, certain problems have been experienced in connection with commercial scale preparation of these catalytic materials. It has been found, for example, that the preparation of the zeolite-matrix type catalysts is subject to wide deviation in terms of product quality and stability. The precise reasons for such non-reproducibility are not readily known, but these problems have been particularly acute in the case of the preparation of the ammonium-form zeolite embedded in siliceous gel matrix.

A most convenient and economical means for preparing the ammonium-form zeolite-matrix catalyst is to first combine the zeolite crystals with the siliceous gel while the zeolite is in the as-synthesized form, which will usually be the sodium form. After the spray-drying step, the spray-dried composite is conveniently treated with an ammonium salt solution to bring about ion exchange between ammonium cations and the sodium cations in the zeolite structure, thereby reducing the alkali metal oxide content of the zeolite to the preferred levels. For obvious economic reasons, a commercial scale manufacturing procedure will attempt to eliminate as many separate filtration and washing steps as possible. Thus, it will be particularly preferred to subject the spray-dried composite to but one washing and filtration step by employing but one filter table (e.g. rotary drum vacuum filter).

It has now been recognized that when the ammonium-form zeolite-matrix catalyst is prepared with but one filtration step, the ultimate quality and stability of the catalyst composition is subject to wide variance. Accordingly, it has also been found that to achieve a satisfactory degree of reproducibility, it is necessary to employ two filtration steps with intermediate water washing in order to remove residual impurities, e.g. sodium ions, derived from the use of an unwashed siliceous hydrogel. While this can be cured through the use of a prewashed hydrogel, that is to say, a hydrogel that has been purified prior to combination with the zeolite—this again adds considerably to the expense of the operation.

In its general aspects the present invention resides in the discovery that consistently high quality zeolitic catalytic materials of the above type can be produced with minimum filtration and washing capacity if the subsequent exchange treatments of the spray-dried composite product are conducted at higher pH values, preferably greater than about 6.5. It has thus been recognized that pH control is an extremely important variable with respect to uniformity of quality and that exposure to low pH exchange treatment and/or low pH wash treatments after exchange is deleterious to catalyst quality. In its more specific aspects superior catalysts of the invention are produced by treating the spray-dried composite with two or more high pH ammonium salt solutions as follows:

(1) The as-synthesized form of crystalline aluminosilicate zeolite (usually the sodium form) is admixed with unwashed siliceous hydrogel of the type hereinbefore described, said hydrogel containing sodium salt impurities.

(2) The composite mixture from step (1) is dried preferably by a relatively rapid drying operation. Spray drying will be preferred, but tray drying can also be used.

(3) The dried composite product from step (2) is reslurried in water and filtered, preferably in continuous operation, such as with a rotary drum vacuum filter or a sectored rotary pan vacuum filter.

(4) The wet composite product on the filter table is sprayed with water to remove the bulk of soluble salts. Ordinary tap water will usually be satisfactory.

(5) The water-washed composite product is treated on the same filter table with a dilute ammonium salt solution to remove the remaining soluble and exchangeable sodium and sulfate ions from the gel matrix and to exchange sodium ions normally contained in the zeolite product in order to reduce the zeolite's $Na_2O$ content to the aforementioned desired levels, thereby forming the "ammonium" form of the zeolite. The pH of the ammonium salt solution is preferably about 6.5 to 9.0 and its concentration, about 1 to 5, preferably 1 to 3 wt. percent. A ratio of about 2 to 10 grams of ammonium salt per gram of the zeolite is suitable. This results in a slurry pH of between 4.5 and 6. Any of the common ammonium salts can be used in this step, such as the sulfate, carbonate, chloride, hydroxide, etc., with ammonium sulfate being particularly preferred.

(6) Without additional water washing, the catalyst composite is treated on the same filter table with an ammonium salt solution containing volatile anions, and having a pH such that the pH of the resulting slurry is higher than the pH of the slurry in the first ammonium salt treatment. It will be preferred to use a solution of ammonium carbonate or ammonium carbonate/ammonium sulfate, or high pH (>9.0) ammonium hydroxide. In the case of the ammonium carbonate-containing solutions, the pH should be greater than about 6.5, e.g. about 6.5 to about 9, in a concentration of about 0.5 to 5.0, preferably 1.0 to 2.5 wt. percent, using a ratio of about 2 to 10 grams of ammonium carbonate per gram of the zeolite. It will be more preferred, however, to use an ammonium hydroxide solution in this step at a pH greater than about 9, e.g. about 9 to 11.0. In any case about 1 to 3 treatments will be suitable, although one treatment will usually suffice.

(7) The catalyst composite is then removed from the filter table without additional water washing, and dried at a temperature of 200 to 500° F., or higher preferably in a flash drier, a horizontal rotary tunnel drier, or the like to reduce the volatile material content to about 8–15 wt. percent. It is now ready for use as a hydrocarbon conversion catalyst.

It is to be noted that the above procedure minimizes intermediate washing and filtration steps, thereby adding to the economic attractiveness of the present process. Furthermore, the final catalyst composite after the successive ammonium salt treatments is immediately dried without customary washing. By eliminating added filtration and washing capacity, the cost of catalyst manufacture is substantially reduced. By means of the present invention, a high quality catalyst is produced having substantially uniform batch-to-batch quality, a result heretofore not generally attainable. The spray-dried composite catalyst containing residual soluble salt impurities can be purified in this manner on a single filter table and dried directly without the need for a final water wash.

The above-mentioned spray-drying step comprises spraying the composite mixture through nozzles into a tower containing hot flowing gases at a temperature at the nozzles in the range of about 600 to 1000° F. This spray-drying procedure is desired because of the increased attrition resistance achieved due to the spherical nature of the particles obtained, as well as the excellent particle size distribution which is useful for fluidized bed processes, e.g. predominantly 20 to 100 micron average particle diameter. By means of the spray-drying step, a highly porous solid is obtained having improved attrition resistance due to the spherical nature of the particles.

In general, the crystalline alumino-silicate zeolites used in the present invention may be represented by the following formula, expressed in terms of moles:

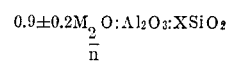

wherein M is selected from the group consisting of metal cations and hydrogen, $n$ is its valence and X is a number from about 1.5 to about 12. The value of X will vary with the particular zeolite in question. Among the well-known natural zeolites are mordenite, faujasite, chabazite, gmelinite, analcite, erionite, etc. Such zeolites differ in structure, composition, and particularly in the ratio of silica to alumina contained in the crystal lattice structure; e.g. mordenite, having a ratio of about 8 to 12: faujasite, having a ratio of about 2.5 to about 7, etc. Similarly, the various types of synthetic crystalline zeolites, e.g. faujasite, mordenite, etc., will also have varying silica-to-alumina ratios depending upon such variables as composition of crystallization mixture, reaction conditions, etc. U.S. Pats. Nos. 3,013,982–86 describe a number of synthetic zeolites, designated therein as zeolites "A," "D," "L," "R," "S," "T," "X," and "Y." The zeolite which will be most preferred in the present invention is the synthetic faujasite variety, wherein X in the above formula is about 2.5 to 7, preferably 3 to 6, most preferably 4 to 5.5. It will usually have an average pore diameter of about 6 to 15, preferably 8 to 13, angstroms.

The processes for producing such crystalline synthetic zeolites are well known in the art. Typically, they involve crystallization from reaction mixtures containing: $Al_2O_3$ as sodium aluminate, alumina sol and the like; $SiO_2$ as sodium silicate and/or silica gel and/or silica sol; alkali metal oxide, e.g. sodium hydroxide, either free or in combination with the above components; and water. Careful control is kept over the alkali metal oxide concenration of the mixture, the proportions of silica to alumina and alkali metal to silica, the crystallization period, etc., to obtain the desired product.

A crystalline hydrated alumino-silicate zeolite is separated from the aqueous mother liquor by decantation or filtration. Conventionally, the product is usually washed and dried at this point. For purposes of the present invention, however, the zeolite is left as a wet cake of known dry solids content to facilitate reslurrying in water for combination with the siliceous hydrogel.

The hydrogels useful in the present invention may be used as supplied commercially or may be separately prepared. For example, a silica-alumina hydrogel may be prepared by first producing a hydrous precipitate of silica by mixing a solution of sodium silicate with an acid, e.g. sulfuric acid, to produce a slurry having a pH below 7, usually below about 4; then adding a solution of an aluminum salt, e.g. aluminum sulfate; and adjusting the pH of the mixture to above about 4 by addition of alkaline material, e.g. ammonia, in order to precipitate the alumina. The amount of aluminum salt used will normally be that required to given a silica-alumina precipitate containing about 8 to 45 wt. percent, preferably 10 to 30 wt. percent, (dry basis) of $Al_2O_3$. It is to be noted that the hydrogels formed by the above procedure, as well as those commercially available forms which are supplied in an "unwashed" state, contain a significant amount of sodium salt impurity. As previously indicated, such "unwashed" hydrogels are of the type preferred in the present invention.

The final zeolite-siliceous gel matrix on a dry solids basis will generally contain about 2 to 30 wt. percent, preferably 4 to 20 wt. percent, of crystalline zeolite, depending upon the intended use of the final composite product. For catalytic cracking purposes the final composite catalyst will typically contain about 4 to 12 wt. percent crystalline zeolite. The water content of the hydrogel or gel or gelatinous precipitate before spray is adjusted to within the range of about 86 to 94 wt. percent, with the crystalline alumino-silicate zeolite having been added in sufficient amount to produce the aforementioned compositions. The resulting slurry is mixed well and is then formed into fluidizable particles by spray drying.

The above-described catalyst may be employed to convert a wide variety of hydrocarbon feeds of various origins; for example, petroleum, various fractions therefrom, such as catalytic recycle stocks, gas oil, top crude, etc., shale oil, synthetic oils, etc. These feeds may contain appreciable quantities of impurities; e.g. oxygen, sulfur, nitrogen and soluble metal compounds. Operating details for hydrocarbon conversion processes are well known in the art. Fluidized bed operation will be preferred. The feedstock is contracted with the catalyst at suitable temperatures, feed rates, pressures, etc., to thereby effect a substantial conversion to lower boiling materials, such as gasoline, middle distillate, etc. For catalytic cracking, suitable operating conditions will usually include a temperature of about 500 to 1200° F., preferably 750 to 1000° F.; a pressure of about 0 to 500 p.s.i.g., preferably 0 to 200 p.s.i.g.; and a space velocity of 0.2 to 20, preferably 1 to 15, weights of feed per weight of catalyst per hour.

It is to be understood that the preferred catalyst composition of the present invention may be characterized as crystalline alumina-silicate particles suspended in and distributed throughout a matrix of amorphous, porous, silica-alumina. This, although the zeolite is partially or entirely enclosed or embedded in a non-zeolitic material, there is still provided sufficient means for access of molecules to and from the zeolite pore openings so as to provide the known attributes of crystalline alumino-silicate materials.

The invention will be more clearly understood by reference to the following examples which are not intended to be limiting.

EXAMPLE 1

A series of catalysts was prepared, said catalysts generally comprising a crystalline alumino-silicate zeolite having a faujasite structure embedded in a silica-alumina hydrogen matrix. The zeolite utilized with the sodium form of a crystalline almino-silicate zeolite having a typical faujastite structure as determined by X-ray analysis and a silica-to-alumina mole ratio of about 4.8. The zeolite crystals had the following approximate analysis: 14.4% $Na_2O$, 63.8% $SiO_2$, 22.2% $Al_2O_3$, which corresponds on a molar basis to $1.1Na_2O:1.0Al_2O_3:4.8SiO_2$.

The silica-alumina hydrogel contained 13 wt. percent alumina based on dry solids and was utilized in an unwashed state. It was prepared by injecting carbon dioxide into a sodium silicate solution having a specific gravity of about 1.1 to reduce the pH and effect gelation to a silica hydrogel. After aging to establish gel structure, the hydrogel was blended with a solution of aluminum sulfate (made from alumina hydrate). This lowered the composite gel pH to about 5.0. The combined silica plus alumina content of the hydrogel was about 6 wt. percent. The mixture contained considerable residual soluble salts, such as sodium sulfate and sodium carbonate.

The sodium form faujasite was slurried in the above silica-alumina hydrogel in an amount sufficient to produce about 5 wt. percent zeolite embedded in 95 wt. percent silica-alumina (13% alumina). The mixture was homogenized and spray dried conventionally at an inlet temperature of about 1000° F. and a bottom cone temperature of about 200° F. The spray dried composite product was then slurried in hot (160° F.) water and the slurry pumped and deposited on a rotary pan vacuum filter. A first portion of the wet filter cake was then successively treated on the filter table with (1) a tap water wash, (2) a 1.5 wt. percent ammonium sulfate treatment at pH 8 and (3) a decationized water wash (pH 2.5). The wet filter cake, after it had received these three treatments, was then divided into separate fractions which were each given a different treat, as follows:

TABLE I

| Treat (additional) | | pH of treat sol'n |
|---|---|---|
| Fraction: | | |
| A | None | |
| B | 2% $(NH_4)_2SO_4$ solution | 5.4 |
| C | 1% $(NH_4)_2SO_4$ plus 1% $NH_4OH$ solution | 8.2 |
| D | 1.5% $(NH_4)_2SO_4$ plus $NH_4OH$ solution | 8.0 |

The catalyst from fraction D is representative of the standard reference catalyst for catalysts of this composition which are made on two rotary filter tables operated in series with an intervening reslurry tank.

A second portion of the wet filter cake was successively treated on the filter table with (1) a tap water wash, (2) a 1.5 wt. percent ammonium sulfate solution at pH 5.2, and (3) a decationized water wash (pH~3.0). It was then divided into separate fractions which were each given a different treat as follows:

TABLE II

| Treat (additional) | | pH of treat sol'n |
|---|---|---|
| Catalyst: | | |
| E | Hot $H_2O$ only | ~7 |
| F | 0.5% $(NH_4)_2SO_4$ | 4.9 |
| G | 0.5% $NH_4OH$ | 10.9 |
| H | 0.5% $(NH_4)_2CO_3$ | 7.6 |

After each treat, the catalysts were each washed with water to remove extraneous anions.

After the above-designated treatments, each catalyst was subsequently calcined at 1000° F. and steamed for 16 hours at 1500° F. and one atmosphere pressure.

The above-prepared catalysts were tested in a catalytic cracking operation conducted at a temperature of 950° F. and atmospheric pressure, using a 2-minute cycle time with a 500–700° F. boiling range virgin gas oil as the feed. The results are compared below at a common 60 wt. percent conversion level (i.e. conversion to products boiling below 430° F.), as accomplished by adjustment of the feed rates. For purposes of comparison, data for catalyst D are included, catalyst D being a standard reference catalyst consisting of 5% hydrogen faujasite in 95% silica-alumina matrix (13% alumina, 87% silica) prepared by previously known procedures. The results of the catalytic cracking tests are set forth in the following table.

TABLE III.—CATALYTIC CRACKING OF VIRGIN GAS OIL

[950° F., atmospheric pressure, 2-min. cycle time]

| | Catalyst | | | | | | | |
|---|---|---|---|---|---|---|---|---|
| | A | B | C[1] | D[2] | E | F | G[1] | H[1] |
| Conversion to 430° F., wt. percent | 60 | 60 | 60 | 60 | 60 | 60 | 60 | 60 |
| Space Velocity, w./hr./w | 0.6 | 1.6 | 2.4 | 2.0 | 0.5 | 0.2 | 2.1 | 2.2 |
| Products: | | | | | | | | |
| Wt. percent carbon | 3.8 | 1.9 | 1.1 | 1.2 | 2.8 | 9.8 | 1.3 | 0.8 |
| Wt. percent $C_5/430$ | 33 | 38 | 40 | 39 | 32 | 22 | 41 | 42 |

[1] Catalysts of the invention.
[2] Reference catalyst.

The superiority of the catalysts prepared by the process of the invention, i.e. catalysts C, G and H, over the comparative catalysts A, B, E and F is evident. The catalysts of the invention are shown to have produced higher gasoline yield and lower carbon make than the comparative catalysts, thus attesting to the diverse results obtainable through seemingly minor variations in the catalyst preparation procedure. The catalysts of the invention are also shown to be about equivalent to the reference catalyst D, which was prepared by the more expensive two-step filtration and washing procedure.

EXAMPLE 2

This example demonstrates the superior quality of the catalysts prepared according to the present invention.

A composite of 5% sodium faujasite dispersed in unwashed $SiO_2/Al_2O_3$ hydrogel was prepared as described in Example 1 and spray dried. The spray dried composite product was then slurried in hot (160° F.) water and the slurry was pumped and discharged on a rotary pan vacuum filter table.

Catalyst J was prepared by successively treating the wet filter cake with (1) tap water, (2) a 1.5 wt. percent ammonium sulfate solution at pH 8, and (3) decationized water. The catalyst so treated was taken from the filter and flash dried. Under actual equilibrium operating conditions for the filter table, about one-third of the washed catalyst is continuously removed. The remaining catalyst cake is broken up and mixed with additional spray dried product slurry, and the cycle is repeated. In this manner an "average" catalyst particle undergoes three complete wash/exchange cycles. Catalyst J was collected during this equilibrium operation of the filter table.

Catalyst K represents a preferred catalyst of the invention. To prepare this catalyst, the initial spray dryer slurry was discharged on to the filter, and the wet filter cake was successively treated with (1) a tap water wash, (2) a 1.5 wt. percent ammonium sulfate solution at pH 8, and (3) a pH 9.5 $NH_4OH$ solution. Operation of the filter table was as described for catalyst J above. Catalyst K, so washed and exchanged, was charged directly to a flash dryer.

Catalyst L represents a catalyst prepared by previously known procedures using two filter tables. Experience with this catalyst demonstrates that recourse to a second filter table does not effect further improvements in the catalyst quality and performance. To prepare catalyst L, the initial spray dryer slurry was discharged on to the filter and the wet filter cake successively treated with (1) tap water, (2) a 1.5 wt. percent ammonium sulfate solution at pH 8, and (3) decationized water. The wet filter cake effluent was re-slurried in tap water and discharged on to a second rotary pan vacuum filter where the catalyst was successively treated with (1) a 1.5 wt. percent ammonium sulfate solution at pH 8, and (2) dilute $NH_4OH$ at about pH 9.5. The effluent catalyst from the second filter table was sent directly to a flash dryer.

Catalysts J, K, and L were each steamed 16 hours at 1500° F. and atmospheric pressure. These catalysts were then tested in a batch fluid unit cracking operation at 950° F., atmospheric pressure, using a 2-minute cycle time, with a 500–700° F. boiling range gas oil as the feed. Feed rates were adjusted to give a common conversion level of 60 wt. percent to cracked products boiling below 430° F. The results of the cracking tests are set forth in Table IV.

TABLE IV.—GAS OIL CRACKING

[950° F., atmospheric pressure, 2-min. cycle time]

| | Catalyst | | |
|---|---|---|---|
| | J | K | L |
| Conversion to 430° F. wt. percent | 60 | 60 | 60 |
| Feed rate, w./hr./w | 1.3 | 2.2 | 2.2 |
| Products: | | | |
| Wt. percent carbon | 2.0 | 1.3 | 1.5 |
| Wt. percent $C_5/430$ | 36.0 | 40.5 | 40.0 |

The above data demonstrate that catalyst J is definitely inferior to the catalyst of the invention, K. The data further demonstrates catalyst J can be improved by additional wash/exchange treats on a second filter table as indicated by the improved performance of catalyst L. Of primary importance is the demonstration that high quality catalyst K, comprising zeolite embedded in a silica/alumina hydrogel matrix, can be prepared with the use of only one filter table by employing a final high pH wash which leaves no undesirable ions in the composite catalyst. Thus, through the use of the catalyst manufacturing process of the present invention, substantial savings in catalyst costs can be effected in terms of reduced equipment demands, working space, manpower, and chemicals.

What is claimed is:

1. An improved process for preparing a catalyst composition comprising a crystalline alumino-silicate zeolite embedded in a siliceous gel matrix, which process comprises:

(1) admixing (a) an alkali metal-containing crystalline alumino-silicate zeolite which has not been previously base exchanged with (b) an unwashed siliceous hydrogel,
(2) rapidly drying said admixture,
(3) reslurrying the dried composite from step (2) in water,
(4) filtering and washing said composite on a filtration unit,
(5) treating the composite from step (4) on the same filter unit with a first dilute ammonium salt solution having a pH such that the pH of the resulting slurry is in the range of 4.5 to 6,
(6) treating said composite on the same filter unit, without intervening wash, with a second dilute ammonium salt solution containing volatile anions and at a pH greater than the pH utilized in step (5); and
(7) without intervening wash, drying said composite.

2. The process of claim 1 wherein the ammonium salt utilized in step (5) is ammonium sulfate and wherein the ammonium salt utilized in step (6) is selected from the group consisting of ammonium carbonate, ammonium hydroxide, and a mixture of ammonium carbonate and ammonium sulfate.

3. The process of claim 2, wherein the pH of said ammonium carbonate solution and said mixture of ammonium carbonate and ammonium sulfate solutions is in the range of about 6.5 to about 9 and wherein the pH of said ammonium hydroxide is greater than about 9.

4. The process of claim 1, wherein said siliceous gel is silica-alumina.

5. The process of claim 1, wherein said siliceous gel is selected from the group consisting of silica gel, cogels of silica and at least one other metal oxide selected from the group consisting of oxides of metals in Groups II-A, III-A and IV-B of the Periodic Table and mixtures thereof.

6. The process of claim 1, wherein said siliceous gel is silica-alumina.

7. The process of claim 1, wherein said zeolite is added in an amount sufficient to produce about 2 to 30 wt. percent zeolite in said catalyst composition.

8. The catalyst composition prepared by the process of claim 1.

References Cited

UNITED STATES PATENTS

| | | | |
|---|---|---|---|
| 3,140,252 | 7/1964 | Frilette et al. | 208—120 |
| 3,344,086 | 9/1967 | Cramer et al. | 252—455X |
| 3,410,808 | 11/1968 | Smith et al. | 252—455X |
| 3,413,238 | 11/1968 | Gladrow et al. | 252—455 |

DANIEL E. WYMAN, Primary Examiner

C. F. DEES, Assistant Examiner

U.S. Cl. X.R.

23—112